Feb. 12, 1952  A. F. MYERS  2,585,489
SHACKLE AND MOUNTING THEREFOR
Filed April 21, 1949
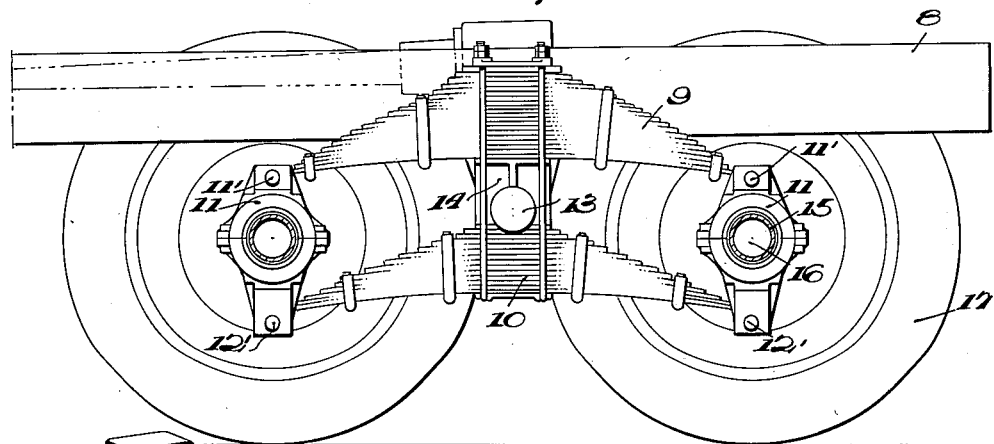
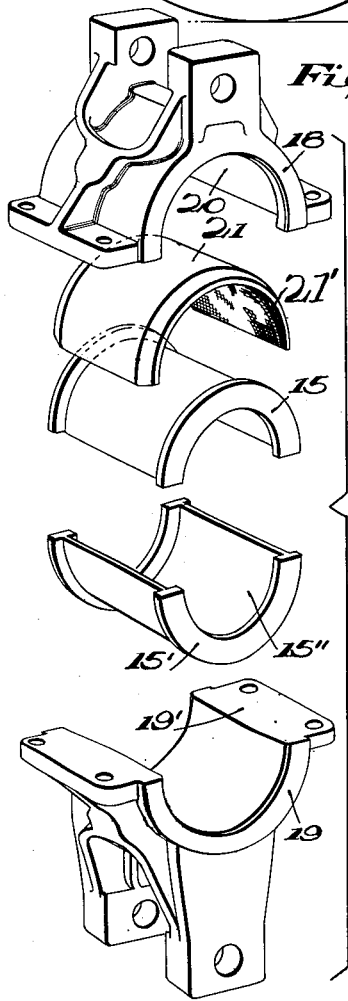
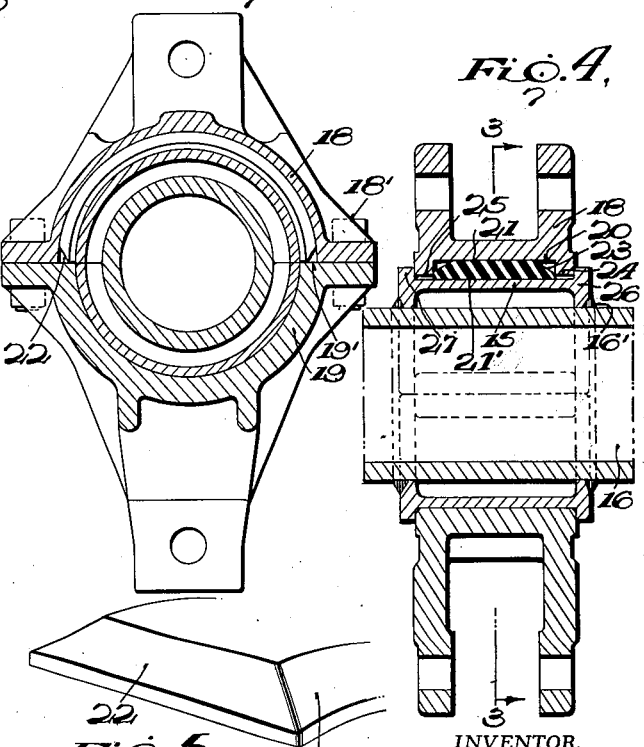
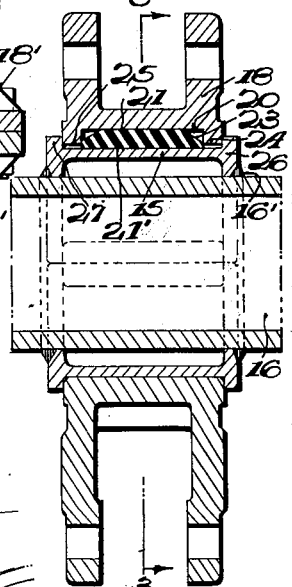
INVENTOR.
Albert F. Myers,
BY Cameron, Kerkam + Sutton
Attorneys

UNITED STATES PATENT OFFICE 2,585,489

SHACKLE AND MOUNTING THEREFOR

Albert F. Myers, Berkley, Mich., assignor to Patent Developers, Inc., Detroit, Mich., a corporation of Michigan Application April 21, 1949, Serial No. 88,783

12 Claims. (Cl. 267—54)

The present invention is an improvement in shackles for springs, and the mounting therefor on an axle or axle sleeves.

The invention involves the provision of a shackle made in two parts, the upper part or half being provided with a semi-circular cavity carrying a suitable elastic or plastic bushing, such as rubber. The ends of this bushing are beveled transversely and also along the lateral margins thereof. These beveled ends engage the upper parting surface of the lower shackle half.

One of the objects of the invention in providing the elastic bushing is to eliminate the need for lubrication between the shackle and the axle or sleeve when there is relative rotation due to spring deflection and bogie articulation.

A second object of the invention is to provide a rubber cushioned shackle to give some flexibility and cushioning of road shocks, and this is effected by making the bushing thicker than the depth of the cavity.

A further object is to permit the rubber bushing to be rotated around the axle or axle sleeve by pressure exerted on one or the other end of the bushing which ends engage the upper surface of the lower shackle half, and this is effected by the provision of the beveled edges.

In the accompanying drawing:

Fig. 1 is a side elevation of a bogie showing the springs on one side thereof connected to the shackles mounted on the axle sleeves;

Fig. 2 is an exploded view showing the upper and lower halves of the shackle, the two halves of the sleeve, and the elastic bushing between the upper half of the shackle and the upper half of the sleeve;

Fig. 3 is a cross sectional view on the line 3—3 of Fig. 4;

Fig. 4 is a cross sectional view at right angles to Fig. 3; and

Fig. 5 is a perspective view of one curved beveled end of the bushing.

Referring to the drawing, illustrating one embodiment of the inventive idea, 8 indicates one of the side members of a bogie, 9 and 10 are the springs on one side thereof, and 13 is a trunnion to which is connected a member 14 carrying the springs 9 and 10. The ends of the springs are connected to shackles 11 by pins 11' and 12'. The shackles are mounted on two part sleeves 15 and 15' which are welded on axles 16 at 16' or the shackles may, if desired, be mounted directly on the axle housing if the surface of the latter is rendered round an smooth. The usual wheels 17 are mounted on axles 16.

Each shackle has an upper half or part 18 and a lower half or part 19 normally secured together by bolts 18'. The upper half is provided with a semi-cylindrical cavity 20 to accommodate a semi-cylindrical bushing 21 of elastic or plastic material such as rubber. The side edges of this bushing are transversely beveled at 22 and along the lateral margins at 23, as shown in Figs. 3, 4, and 5. The bushing 21 is thicker than the depth of the cavity 20 as seen in Fig. 4.

The upper shackle half 18 is provided with flanges 24 and 25 that engage and slide between flanges 26 and 27 on the sleeve 15. Any side load is taken by these flanges and not transmitted through the bushing 21.

The bushing 21 being thicker than the depth of cavity 20 permits the bushing to slide on the surface of the sleeve 15. Further, the fact that the bushing is thicker than the depth of the cavity 20 also gives flexibility and some cushioning of road shocks.

There is no bushing between the lower half 15' of the sleeve and the lower half 19 of the shackle because the only force acting between the lower half surfaces of the shackle and sleeve is that due to rebound. For reasons of weight, economy, and to simplify the machining of the bore, the inner part of the sleeve half 15' is cored out at 15''.

It is necessary to allow the bushing to flow under load since a confined rubber bushing construction cannot be used; and this flowing is made possible by beveling the side edges of the bushing at 22 and the lateral margins adjacent the ends at 23. Since these beveled edges are in contact with the upper parting surface of the lower shackle half 19 at 19' the bushing will be rotated around the sleeve by pressure exerted on one or the other beveled edges by the surface 19'.

As noted, the bushing 21 may be made of any suitable elastic or plastic material, such as rubber, and its surface that slides on the sleeve 15 may be bonded to a thin sheeting or film of other good wearing material, such as nylon as indicated at 21', Fig. 2.

The same size shackles and bushings can be used for a wide range of axles and each of the sleeves has the same outside diameter so that one shackle design can fit any of the sleeves; but it is necessary to vary the inside bore size of the sleeve halves 15 and 15' for axles of different diameter.

The inventive concept is susceptible of em-

What is claimed is:

1. A two-part actual mounting spring shackle one part having a semi-cylindrical cavity, a yieldable semi-cylindrical bushing for the cavity the bushing being thicker than the cavity is deep and the side edges of the bushing being beveled and bearing against the rigid parting surface of the other half of the shackle.

2. A two-part axle mounted spring shackle the upper part having a semi-cylindrical cavity, a yieldable semi-cylindrical bushing for the cavity the bushing being thicker than the cavity is deep and the side edges of the bushing being beveled transversely and along its lateral margins and bearing against the rigid upper parting surface of the lower half of the shackle.

3. A two-part axle mounted spring shackle, an elastic semi-cylindrical bushing with beveled side edges carried in a semi-cylindrical cavity in one part of the shackle the bushing being thicker than the depth of the cavity and the beveled side edges of the bushing engaging the rigid parting surface of the other half of the shackle.

4. A two-part axle mounted spring shackle, an axle housing on which said shackle is mounted for oscillation, an elastic semi-cylindrical bushing with beveled side edges carried in a semi-cylindrical cavity in one part of the shackle the bushing being thicker than the depth of the cavity and the beveled side edges of the bushing engaging the rigid parting surface of the other half of the shackle.

5. A two-part axle mounted spring shackle, a two-part sleeve on which the shackle is mounted for oscillation, an elastic semi-cylindrical bushing with beveled side edges carried in a semi-cylindrical cavity in one part of the shackle and engaging the adjacent part of said sleeve the bushing being thicker than the depth of the cavity and the beveled side edges of the bushing engaging the rigid parting surface of the other half of the shackle.

6. A two-part axle mounted spring shackle, a two-part sleeve on which the shackle is mounted for oscillation, an elastic semi-cylindrical bushing with beveled side edges carried in a semi-cylindrical cavity in the upper part of the shackle and bearing on the adjacent part of said sleeve the bushing being thicker than the depth of the cavity and the beveled side edges of the bushing engaging the rigid upper parting surface of the lower half of the shackle and said bushing being yieldable vertically and rotatably.

7. A two-part axle mounted spring shackle the upper part only having a semi-cylindrical cavity, a yieldable semi-cylindrical bushing for the cavity in the upper part the bushing being thicker than the cavity is deep and the side edges of the bushing being beveled transversely and along its lateral margins and bearing against the rigid upper parting surface of the lower half of the shackle said bushing being covered by a wear-resisting material.

8. A two-part axle mounted spring shackle, a two-part sleeve mounted in said shackle, an elastic semi-cylindrical bushing with beveled side edges carried in a semi-cylindrical cavity in the upper part of the shackle and bearing on the adjacent part of said sleeve the bushing being thicker than the depth of the cavity and the beveled side edges of the bushing engaging the rigid upper parting surface of the lower half of the shackle and said bushing being yieldable vertically and rotatably and being coated by a wear-resisting material.

9. A two-part axle mounted spring shackle the upper half of which is provided with a semi-cylindrical cavity and flanges, a sleeve on which the shackle is mounted for oscillation also provided with flanges between which the shackle flanges slide and which flanges take any axial load, and a yieldable semi-cylindrical bushing thicker than the depth of said cavity and carried therein and bearing on the adjacent portion of said sleeve.

10. A two-part axle mounted spring shackle the upper half of which is provided with a semi-cylindrical cavity and flanges, a sleeve on which the shackle is mounted for oscillation also provided with flanges between which the shackle flanges slide and which flanges thus take any side load, and a yieldable semi-cylindrical bushing thicker than the depth of said cavity and carried therein and bearing on the adjacent portion of said sleeve the side edges of said bushing being transversely beveled.

11. A two-part axle mounted spring shackle the upper half of which is provided with a semi-cylindrical cavity and flanges, a sleeve on which the shackle is mounted for oscillation also provided with flanges between which the shackle flanges slide and which flanges thus take any side load, and a yieldable semi-cylindrical bushing thicker than the depth of said cavity and carried therein and bearing on the adjacent portion of said sleeve the side edges of said bushing being transversely beveled and the lateral marginal extremities of said side edges being beveled.

12. A two-part axle mounted spring shackle, a two-part sleeve carried thereby, an elastic semi-cylindrical bushing with beveled side edges carried in a semi-cylindrical cavity in the upper part of the shackle the bushing being thicker than the depth of the cavity and bearing on the adjacent part of said sleeve and the beveled side edges of the bushing engaging the rigid upper parting surface of the lower half of the shackle and said bushing being yieldable vertically and rotatably, the shackle and bushing being interchangeable with sleeves of the same external diameter but different internal diameters for various sizes of axles.

ALBERT F. MYERS.

REFERENCES CITED

The following references are of record in the file of this patent:

UNITED STATES PATENTS

| Number | Name | Date |
|---|---|---|
| 149,284 | Baker | Apr. 7, 1874 |
| 673,502 | Magee | May 7, 1901 |
| 1,993,260 | Burns | Mar. 5, 1935 |
| 2,061,767 | Hobson | Nov. 24, 1936 |
| 2,467,530 | Johnson | Apr. 19, 1949 |

FOREIGN PATENTS

| Number | Country | Date |
|---|---|---|
| 509,996 | Germany | Oct. 15, 1930 |